United States Patent
Takahara et al.

(10) Patent No.: US 8,108,106 B2
(45) Date of Patent: Jan. 31, 2012

(54) MOTION CONTROL SYSTEM FOR VEHICLE

(75) Inventors: Yasuo Takahara, Anjo (JP); Haruo Arakawa, Toyota (JP); Takayuki Takeshita, Anjo (JP); Chihiro Nitta, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 538 days.

(21) Appl. No.: 12/377,083

(22) PCT Filed: Jan. 25, 2008

(86) PCT No.: PCT/JP2008/051612
§ 371 (c)(1),
(2), (4) Date: Feb. 10, 2009

(87) PCT Pub. No.: WO2008/114537
PCT Pub. Date: Sep. 25, 2008

(65) Prior Publication Data
US 2010/0174453 A1 Jul. 8, 2010

(30) Foreign Application Priority Data
Feb. 22, 2007 (JP) ................................. 2007-042368

(51) Int. Cl.
*B60T 8/1755* (2006.01)
(52) U.S. Cl. .......................................... 701/41; 477/182
(58) Field of Classification Search .................... 701/41; 477/182, 186; 180/282; *B60T 8/1755*
See application file for complete search history.

(56) References Cited

U.S. PATENT DOCUMENTS

| 4,723,638 | A * | 2/1988 | Tsuchida .................. 188/181 A |
| 6,216,079 | B1 * | 4/2001 | Matsuda .......................... 701/70 |
| 7,575,089 | B2 * | 8/2009 | Sherwin ........................ 180/411 |
| 7,630,816 | B2 * | 12/2009 | Yasutake et al. ................ 701/72 |
| 2004/0162187 | A1 * | 8/2004 | Suzuki .......................... 477/182 |
| 2005/0012392 | A1 | 1/2005 | Kato et al. |

(Continued)

FOREIGN PATENT DOCUMENTS

JP 63-028709 A 2/1988
(Continued)

OTHER PUBLICATIONS

Form PCT/ISA/210 (International Search Report) dated Aug. 20, 2008.
(Continued)

*Primary Examiner* — Tuan C. To
(74) *Attorney, Agent, or Firm* — Buchanan Ingersoll & Rooney PC

(57) ABSTRACT

A motion control system is applied to a vehicle, which has front wheel side suspensions with an anti-dive geometry and rear wheel side suspensions with an anti-lift geometry. When abrupt steering operation is started from a straight-ahead driving state of the vehicle in a non-operating period of a brake pedal of the vehicle, a controller controls a hydraulic unit such that a brake force is applied to a radially outer one of front left and right wheels, which is located on an outer side in a radial direction of an arc of turn of the vehicle upon starting the steering operation, and also to a radially inner one of rear left and right wheels, which is located on an inner side in the radial direction of the arc of the turn for a predetermined short time period.

6 Claims, 6 Drawing Sheets

U.S. PATENT DOCUMENTS

| | | |
|---|---|---|
| 2006/0241828 A1 | 10/2006 | Yasui et al. |
| 2006/0259225 A1* | 11/2006 | Ono et al. .................. 701/82 |
| 2008/0114511 A1* | 5/2008 | Sakugawa et al. .............. 701/41 |
| 2009/0048753 A1* | 2/2009 | Ogawa et al. ................... 701/79 |
| 2010/0174463 A1* | 7/2010 | Uragami et al. ................ 701/70 |
| 2011/0121642 A1* | 5/2011 | Heinebrodt et al. .......... 303/146 |

FOREIGN PATENT DOCUMENTS

| | | | |
|---|---|---|---|
| JP | 7-266836 A | | 10/1995 |
| JP | 2004044778 A | * | 2/2004 |
| JP | 2005-035451 A | | 2/2005 |
| JP | 2006298184 A | * | 11/2006 |

OTHER PUBLICATIONS

Form PCT/ISA/237 (Written Opinion of the International Searching Authority) dated Aug. 20, 2008.

* cited by examiner

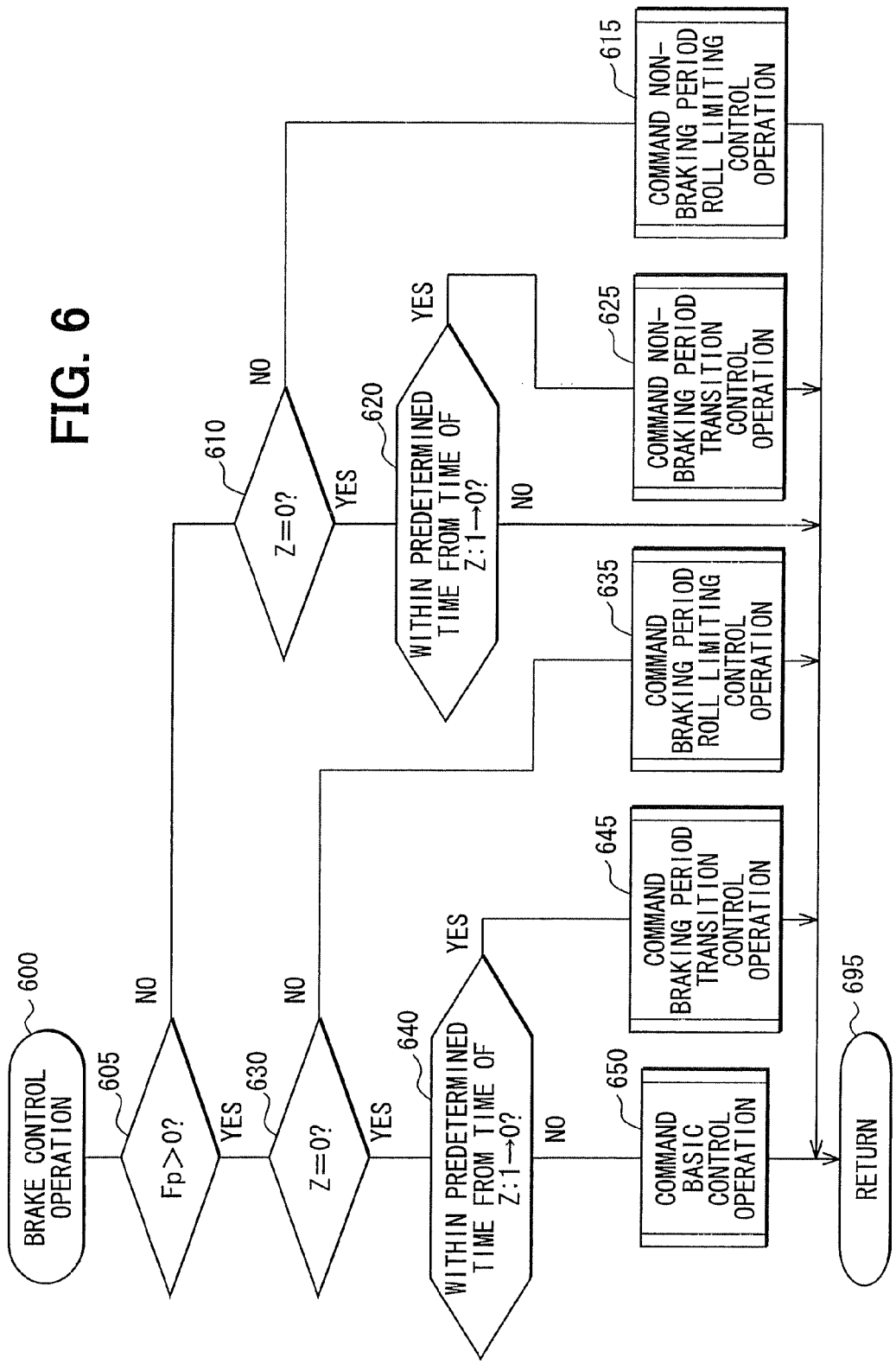

MOTION CONTROL SYSTEM FOR VEHICLE

CROSS REFERENCE TO RELATED APPLICATION

This application is based on and incorporates herein by reference Japanese Patent Application No. 2007-042368 filed on Feb. 22, 2007.

TECHNICAL FIELD

The present invention relates to a motion control system for a vehicle.

BACKGROUND ART

Some known vehicle suspensions have stabilizers, each of which is designed to exert a torsional force for reducing a stroke difference between left and right suspensions (specifically, between front left and right suspensions and also between rear left and right suspensions) to limit roll motion of the vehicle at the time of turning the vehicle. With such suspensions, the roll rigidity is increased, so that the roll motion of the vehicle at the time of turning is limited.

In order to increase the degree of limiting of the roll motion, it is conceivable to use the stabilizers, which show the large torsional force against the stroke difference between the left and right suspensions (hereinafter, referred to as the anti-roll effect). However, in a case where the stabilizers, which show an excessively large anti-roll effect, are adapted, the above torsional force is exerted even when the stroke difference between the left and right suspensions is generated due to presence of bumps on a road surface at the time of driving straight-ahead on, for example, a rough road. As a result, there is implemented an effect, which is similar to an effect of increasing a spring constant of a spring of each suspension that supports the vehicle body, so that ride feeling of an occupant(s) is deteriorated. In other words, the ride feeling of the occupant(s) is deteriorated during the time of driving the vehicle, particularly, in the straight-ahead driving state.

Thereby, it is demanded to adapt the stabilizers, which do not show the large anti-roll effect to maintain the good ride feeling of the occupant(s) in the straight-ahead driving, and which effectively limit the roll motion of the vehicle during the turning. In view of this, for example, it is conceivable to adapt the stabilizers, which can vary the degree of the anti-roll effect. The stabilizers, which can vary the degree of the anti-roll effect, are disclosed in, for example, Japanese Unexamined Patent Publication No. S63-28709 and Japanese Unexamined Patent Publication No. H07-266836.

However, in Japanese Unexamined Patent Publication No. S63-28709 and Japanese Unexamined Patent Publication No. H07-266836, in order to change the degree of the anti-roll effect of the stabilizers, a dedicated mechanism needs to be provided to the suspensions. This may result in an increase in the manufacturing costs, deterioration of mountability of the system on the vehicle and deterioration of the manufacturability of the system.

DISCLOSURE OF THE INVENTION

The present invention addresses the above disadvantage. Thus, it is an objective of the present invention to provide a vehicle motion control system, which can effectively limit roll motion (uncomfortable roll motion) of a vehicle during turning of the vehicle and can maintain relatively good ride feeling of an occupant(s) in a straight-ahead driving state without providing a dedicated mechanism in suspensions of the vehicle.

To achieve the objective of the present invention, there may be provided a motion control system for a vehicle, including at least one front wheel side suspension, at least one rear wheel side suspension, a brake control apparatus and a first roll limiting control means. The at least one front wheel side suspension is provided to front left and right wheels of the vehicle and has an anti-dive geometry. The at least one rear wheel side suspension is provided to rear left and right wheels of the vehicle and has an anti-lift geometry. The brake control apparatus is operable to independently apply and control brake forces at the front left and right wheels and the rear left and right wheels, respectively. The first roll limiting control means is for controlling the brake control apparatus during steering operation of a steering operating member of the vehicle by a driver from a straight-ahead driving state of the vehicle in a non-operating period of a brake operating member of the vehicle by the driver. The first roll limiting control means controls the brake control apparatus such that the brake force is applied to at least one of a radially outer one of the front left and right wheels and a radially inner one of the rear left and right wheels while a sum of the brake force of the radially outer one of the front left and right wheels and the brake force of the radially inner one of the rear left and right wheels is equal to or smaller than a predetermined value. Here, the radially outer one (radially outer front wheel) of the front left and right wheels is located on an outer side in a radial direction of an arc of turn of the vehicle upon starting the steering operation, and the radially inner one (radially inner rear wheel) of the rear left and right wheels is located on an inner side in the radial direction of the arc of the turn. The first roll limiting control means starts the controlling of the brake control apparatus when a rate of change in an amount of operation of the steering operating member in the non-operating period of the brake operating member becomes larger than a predetermined rate. The first roll limiting control means terminates the controlling of the brake control apparatus when an angular acceleration of a roll angle of a vehicle body of the vehicle is changed from a positive range to a negative range. The roll angle of the vehicle body is defined such that when a radially outer side of the vehicle body, which is located on the outer side in the radial direction of the arc of the turn, is tilted downward, the roll angle of the vehicle body is in the positive range.

In the above motion control system, the anti-dive geometry of the at least one front wheel side suspension limits diving of the vehicle body (a phenomenon of sinking of a front side of the vehicle body) at the time of applying the brakes. Furthermore, the anti-lift geometry of the at least one rear wheel side suspension limits lifting of the vehicle body (a phenomenon of floating of a rear side of the vehicle body) at the time of applying the brakes. Hereinafter, the terms "anti-dive" and "anti-lift" may also be collectively referred to as "anti-pitching". The first roll limiting control means controls the brake control apparatus such that the sum of the brake force of the radially outer one of the front left and right wheels and the brake force of the radially inner one of the rear left and right wheels is equal to or smaller than the predetermined value. For example, this predetermined value may be set to a relatively small value, which does not cause an uncomfortable feeling of the vehicle occupant(s) with respect to the deceleration of the vehicle body caused by the brake force applied to the at least one of the radially outer one of the front left and right wheels and the radially inner one of the rear left and right wheels.

When the rate of change in the amount of operation of the steering operating member (i.e., the rate of angular change in the steering operating member, such as a steering wheel) from the straight-ahead driving state of the vehicle in the non-operating period of the brake operating member becomes larger than the predetermined rate, i.e., when the abrupt steering operation of the steering member is started to possibly cause the uncomfortable feeling of the vehicle occupant(s), the brake force is applied to the at least one of the radially outer one of the front left and right wheels and the radially inner one of the rear left and right wheels.

Here, in general, the anti-pitching effect (anti-pitching force) of the anti-pitching geometry may be exerted individually at each corresponding wheel, to which the brake force is applied. Thus, when the brake force is applied to the at least one of the radially outer one of the front left and right wheels and the radially inner one of the rear left and right wheels, at least one of the anti-dive force for lifting the radially outer front portion of the vehicle body and the anti-lift force for downwardly urging the radially inner rear portion of the vehicle body may be generated. In such a case, the at least one of the anti-dive force and the anti-lift force may function as the limiting force for limiting the roll motion of the vehicle.

With the above construction, in the case where the abrupt steering operation is started in the non-operating period of the brake operating member to possibly cause a large disturbance in the roll angle, the brake force is applied to the at least one of the radially outer one of the front left and right wheels and the radially inner one of the rear left and right wheels. Thus, the increase in the roll angle is effectively limited without providing the dedicated mechanism in the suspensions. As a result, the roll motion (uncomfortable roll motion) of the vehicle at the time of the turning of the vehicle during the non-operating period of the brake operating member can be effectively limited, and the comfortable ride feeling of the vehicle occupant(s) is maintained in the straight-ahead driving state by adapting the suspensions, which do not have the large anti-roll effect.

In addition, with the above construction, the time period of applying the brake force to the at least one of the radially outer one of the front left and right wheels and the radially inner one of the rear left and right wheels is limited to the time period between the time of starting the abrupt steering operation and the time of changing of the angular acceleration of the roll angle from the positive range to the negative range (i.e., the time of changing of the angular speed of the roll angle from the increasing state to the decreasing state). Here, as will be described latter, when the time period of applying the brake force to the at least one of the radially outer one of the front left and right wheels and the radially inner one of the rear left and right wheels is limited in the above described manner, convergence of the roll motion is effectively improved (see FIG. 3). In this way, the convergence of the roll motion is effectively improved.

Japanese Unexamined Patent Publication No. 2005-35451 (corresponding to US 2005/0012392 A1) recites a motion control system, which limits the roll motion of the vehicle by generating the anti-lift force (the downwardly urging force) in the radially inner rear portion of the vehicle body by applying the brake force to the radially inner one of the rear left and right wheels when a lateral acceleration of the vehicle at the time of turning of the vehicle during the non-operating period of the brake operating member becomes equal to or larger than a predetermined value. Specifically, the brake force is not applied to the radially inner one of the rear left and right wheels until the lateral acceleration of the vehicle body reaches the predetermined value after the starting of the abrupt steering operation. In contrast to this, in the motion control system of the present invention, the application of the brake force to the at least one of the radially outer one of the front left and right wheels and the radially inner one of the rear left and right wheels is started at the time of starting the abrupt steering operation, i.e., is started before the time of reaching of the lateral acceleration of the vehicle body to the predetermined value. As discussed above, the motion control system of the present invention is distinctly different from the motion control system of Japanese Unexamined Patent Publication No. 2005-35451 (corresponding to US 2005/0012392 A1) and allows the starting of the application of the brake force for limiting the roll motion at the time earlier than that of Japanese Unexamined Patent Publication No. 2005-35451 (corresponding to US 2005/0012392 A1).

In the motion control system of the present invention, it is desirable that the brake force, which is applied to the radially outer one of the front left and right wheels, is generally the same as the brake force, which is applied to the radially inner one of the rear left and right wheels. The brake force, which is applied to the radially outer wheel, causes generation of a yawing moment in a direction opposite from the turning direction of the vehicle. In contrast, the brake force, which is applied to the radially inner wheel, causes generation of a yawing moment in a direction, which is the same as the turning direction. Thus, when the brake force, which is applied to the radially outer one of the front left and right wheels, is generally the same as the brake force, which is applied to the radially inner one of the rear left and right wheels, the above two yaw moments, which are respectively generated in the opposite directions, may become generally the same and thereby may be canceled with each other. As a result, it is possible to limit the change in the lateral acceleration of the vehicle caused by the application of the brake force to the radially outer one of the front left and right wheels and the radially inner one of the rear left and right wheels, and thereby it is possible to limit the generation of the uncomfortable turning feeling of the driver.

Furthermore, the motion control system of the present invention may additionally include a basic control means and a second roll limiting control means. The basic control means is for controlling the brake control apparatus based on an amount of operation of the brake operating member in an operating period of the brake operating member such that basic brake forces are applied to the front left and right wheels and the rear left and right wheels, respectively, in such a manner that the basic brake forces of the front left and right wheels are generally equal to each other, and the basic brake forces of the rear left and right wheels are generally equal to each other. The second roll limiting control means is for controlling the brake control apparatus during steering operation of the steering operating member by the driver from the straight-ahead driving state of the vehicle in the operating period of the brake operating member. The second roll limiting control means controls the brake control apparatus such that a sum of the brake forces of the front left and right wheels and the rear left and right wheels is generally the same as a sum of the basic brake forces of the front left and right wheels and the rear left and right wheels, and at least one of the following two conditions is satisfied: the brake force of the radially outer one of the front left and right wheels is larger than the brake force of a radially inner one of the front left and right wheels located on the inner side in the radial direction of the arc of the turn; and the brake force of the radially inner one of the rear left and right wheels is larger than the brake force of a radially outer one of the rear left and right wheels located on the outer side in the radial direction of the arc of the turn.

The second roll limiting control means starts the controlling of the brake control apparatus when the rate of change in the amount of operation of the steering operating member in the operating period of the brake member becomes larger than the predetermined rate. The second roll limiting control means terminates the controlling of the brake control apparatus when the angular acceleration of the roll angle of the vehicle body is changed from the positive range to the negative range.

In this way, the brake forces of the four wheels (the front left and right wheels and the rear left and right wheels) are controlled to achieve the corresponding basic brake forces, respectively. Hereinafter, the above control operation will also be referred to as a basic control operation.

When the abrupt steering operation is started during the operating period of the brake operating member to possibly cause the uncomfortable roll motion, the basic brake forces of the four wheels are changed to satisfy the at least one of the following two conditions: the brake force of the radially outer one of the front left and right wheels is larger than the brake force of the radially inner one of the front left and right wheels; and the brake force of the radially inner one of the rear left and right wheels is larger than the brake force of the radially outer one of the rear left and right wheels. That is, the anti-dive force for lifting the radially outer front portion of the vehicle body (the force for lifting the radially outer front portion of the vehicle body) may become larger than the anti-dive force for lifting the radially inner front portion of the vehicle body, and in addition or alternatively, the anti-lift force for downwardly urging the radially inner rear portion of the vehicle may become larger than the anti-lift force for downwardly urging the radially outer rear portion of the vehicle body. The above brake force difference between the left and right wheels may effectively limit the roll motion.

With the above construction, even in the case where the abrupt steering operation is started during the operating period of the brake operating member to possibly cause the large disturbance in the roll angle, the provision of the brake force difference between the left and right wheels can effectively limit the increase of the roll angle without providing the dedicated mechanism in the suspensions. Thus, the roll motion (uncomfortable roll motion) of the vehicle at the time of the turning of the vehicle during the operating period of the brake operating member can be effectively limited, and the comfortable ride feeling of the vehicle occupant(s) in the straight-ahead driving state is maintained by adapting the suspensions, which do not have the large anti-roll effect.

In addition, with the above construction, the time period of providing the brake force difference between the left and right wheels is limited to the time period between the time of starting the abrupt steering operation and the time of changing of the angular acceleration of the roll angle from the positive range to the negative range (i.e., the time of changing of the angular speed of the roll angle from the increasing state to the decreasing state). In this way, the convergence of the roll motion is effectively improved.

Furthermore, the second roll limiting control means may control the brake control apparatus to satisfy at least one of the following two conditions: the brake force of the radially inner one of the front left and right wheels is smaller than the basic brake force of the radially inner one of the front left and right wheels by a first amount, while the brake force of the radially outer one of the front left and right wheels is larger than the basic brake force of the radially outer one of the front left and right wheels by the first amount; and the brake force of the radially outer one of the rear left and right wheels is smaller than the basic brake force of the radially outer one of the rear left and right wheels by a second amount, while the brake force of the radially inner one of the rear left and right wheels is larger than the basic brake force of the radially inner one of the rear left and right wheels by the second amount.

In this way, the sum of the brake forces applied to the front wheels and the sum of the brake forces applied to the rear wheel are not changed from those in the basic control operation. That is, the brake force distribution between the front wheels and the rear wheels is not changed from that of the basic control operation. In addition, the yawing moment in the direction opposite from the turning direction of the vehicle caused by the provision of the brake force difference between the front left and right wheels is generally the same as the yawing moment in the direction, which is the same as the turning direction and is caused by the provision of the brake force difference between the rear left and right wheels, so that these yawing moments may possibly cancel with each other. As a result, it is possible to limit the change in the lateral acceleration caused by the provision of the brake force difference between the left and right wheels, and thereby it is possible to limit the uncomfortable turning feeling of the driver.

BRIEF DESCRIPTION OF THE DRAWINGS

The invention, together with additional objectives, features and advantages thereof, will be best understood from the following description, the appended claims and the accompanying drawings in which:

FIG. 6 is a flowchart showing a routine for a brake control operation executed by the CPU shown in FIG. 1;

BEST MODES FOR CARRYING OUT THE INVENTION

Figure 1:
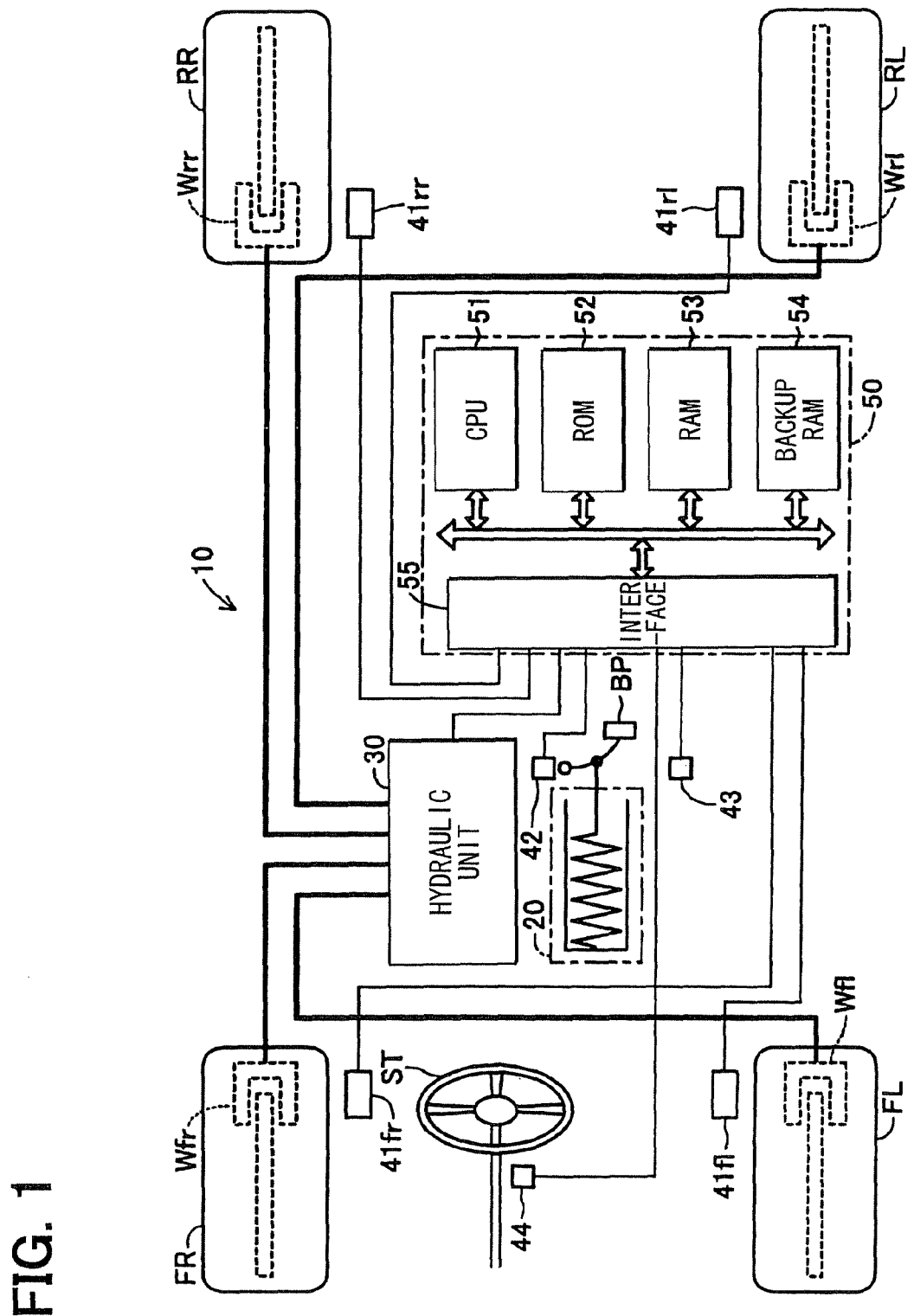
FIG. 1 is a schematic structural diagram of a vehicle, in which a vehicle motion control system according to an embodiment of the present invention is implemented.

A vehicle motion control system according to an embodiment of the present invention will be described with reference to the accompanying drawings. FIG. 1 shows a schematic structure of a vehicle, in which the vehicle motion control system 10 of the present embodiment is installed.

In the vehicle motion control system 10, a brake-by-wire system is provided, and a brake pedal BP (a brake operating member) and a brake fluid pressure circuit are separated. The vehicle motion control system 10 includes a stroke simulator mechanism 20 and a hydraulic unit 30. The hydraulic unit 30 applies a hydraulic pressure to generate a brake force at respective vehicle wheels FL, FL, RL, RR.

The stroke simulator mechanism 20 includes a known reaction force applying mechanism, which applies an appropriate reaction force (=brake pedal pressing force Fp) that corresponds to a stroke of the brake pedal BP, to the brake pedal BP. The reaction force applying mechanism will not be described in detail for the sake of simplicity. With the reaction force applying mechanism, a driver of the vehicle can obtain an appropriate brake pedal feeling at the time of operating the brake pedal BP.

The hydraulic unit 30 has a known structure, which includes a plurality of solenoid valves, a hydraulic pump and a motor (not shown). Furthermore, the hydraulic unit 30 can individually adjust the hydraulic pressure (hereinafter, referred to as wheel cylinder hydraulic pressure Pwfl, Pwfr, Pwrl, Pwrr) of wheel cylinders Wfl, Wfr, Wrl, Wrr of the vehicle wheels FL, FR, RL, RR.

The vehicle motion control system 10 further includes wheel speed sensors 41fl, 41fr, 41rl, 41rr of an electromagnetic pickup type, a pressing force sensor (pedal force sensor) 42, a roll angle sensor 43 and a steering angle sensor 44. Each wheel speed sensor 41fl, 41fr, 41rl, 41rr outputs a signal, which has a corresponding frequency that corresponds to the wheel speed of the corresponding one of the wheels FL, FR, RL, RR. The pressing force sensor 42 outputs a signal, which indicates the brake pedal pressing force (pedal force) Fp applied from a foot of the driver against the brake pedal BR The roll angle sensor 43 outputs a signal, which indicates a roll angle θr of the vehicle body. The steering angle sensor 44 outputs a signal, which indicates a steering angle θs that is a rotational angle of a steering wheel (steering operating member) ST from a neutral position. The roll angle θr becomes a positive value at the time of tilting the vehicle body in a radially outward direction with respect to a turning arc of the vehicle (an outward direction in a radial direction of an arc of turn of the vehicle).

The vehicle motion control system 10 further includes an electronic controller 50. The electronic controller 50 is a microcomputer that includes a CPU 51, a ROM 52, a RAM 53, a backup RAM 54 and an interface 55, which are interconnected with each other through a bus line. The interface 55 is connected to the wheel speed sensors 41fl, 41fr, 41rl, 41rr, the pressing force sensor 42, the roll angle sensor 43 and the steering angle sensor 44. Also, the interface 55 outputs drive signals to, for example, the solenoid valves of the hydraulic unit 30 and the motor based on a command of the CPU 51.

Furthermore, in the vehicle shown in FIG. 1, stabilizers are respectively provided to two front wheel side suspensions (front left and right wheel suspensions) FS and two rear wheel side suspensions (rear left and right wheel suspensions) RS to increase the roll rigidity at the time of turning. Here, as discussed above, when the stabilizers, which show an excessively large anti-roll effect, are adapted, the ride feeling of the occupant(s) is disadvantageously deteriorated during straight-ahead driving of the vehicle along, for example, a rough road. Thus, in the present vehicle, the stabilizers, which show a moderate or small anti-roll effect, are provided to the front wheels FL, FR and the rear wheels RL, RR.

Figure 2:
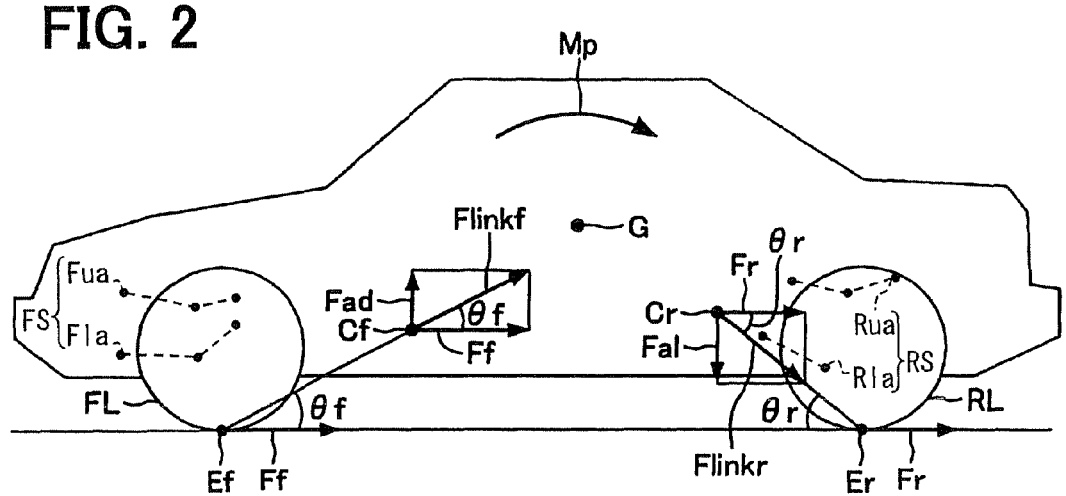
FIG. 2 is a diagram for describing an anti-pitching geometry implemented in suspensions of the vehicle.

Next, an anti-pitching geometry of the suspensions FS, RS of the vehicle, into which the vehicle motion control system 10 of FIG. 1 (also, referred to as the present system) is installed, will be briefly described with reference to FIG. 2. In FIG. 2, only a front upper arm Fua and a front lower arm Fla of a left one of the two front wheel side suspensions (front left and right wheel suspensions) FS and a rear upper arm Rua and a rear lower arm Rla of a left one of the two rear wheel side suspensions (rear left and right wheel suspensions) RS are schematically depicted for the sake of simplicity. As shown in FIG. 2, an instantaneous center Cf of the motion of each front wheel FL, FR relative to the vehicle body caused by a stroke of the front wheel side suspension FS is located at a point, which is on an upper side of a ground contact point Ef of the front wheel FL, FR and is on a vehicle body rear side of the ground contact point Ef, as viewed from a lateral side of the vehicle body. The location of the instantaneous center Cf in the lateral side view of the vehicle body changes momentarily according to the amount of stroke of the front wheel side suspension FS.

Now, it is assumed that a line, which connects between the instantaneous center Cf and the ground contact point Ef, is a front wheel side imaginary link. In such a case, a horizontal component Ff of an axial compression force Flinkf, which is applied to the front wheel side imaginary link during the braking period, acts as a front wheel brake force. A vertical component Fad of the compression force Flinkf acts as a lifting force, i.e., anti-dive force, which is exerted by the front wheel side suspension FS to lift the front portion of the vehicle body. As discussed above, the front wheel side suspension FS has the anti-dive geometry, which implements an anti-dive effect during the braking period.

An instantaneous center Cr of the motion of each rear wheel RL, RR relative to the vehicle body caused by a stroke of the corresponding rear wheel side suspension RS is located at a point, which is on an upper side of a ground contact point Er of the rear wheel RL, RR and is on a vehicle body front side of the ground contact point Er, as viewed from the lateral side of the vehicle body. The location of the instantaneous center Cr in the lateral side view of the vehicle body also changes momentarily according to the amount of stroke of the rear wheel side suspension RS.

Now, it is assumed that a line, which connects between the instantaneous center Cr and the ground contact point Er, is a rear wheel side imaginary link. In such a case, a horizontal component Fr of an axial tensile force Flinkr, which is applied to the rear wheel side imaginary link during the braking period, acts as a rear wheel brake force. A vertical component Fal of the tensile force Flinkr acts as a downwardly urging force, i.e., anti-lift force, which is exerted by the rear wheel side suspension RS to downwardly urge the rear portion of the vehicle body. As discussed above, the rear wheel side suspension RS has the anti-lift geometry, which implements an anti-lift effect during the braking period.

As described above, during the braking period, the anti-pitching effect is achieved by the anti-dive effect, which is implemented by the anti-dive geometry of each front wheel side suspension FS, and the anti-lift effect, which is implemented by the anti-lift geometry of each rear wheel side suspension RS. Thereby, anti-pitching moment Mp is generated around a center of gravity G of the vehicle. As a result, the pitching is limited during the braking period.

Now, an angle, which is defined between the front wheel side imaginary link and the horizontal line in the lateral side view of the vehicle body, is denoted as θf. Furthermore, an angle, which is defined between the rear wheel side imaginary link and the horizontal line in the lateral side view of the vehicle body, is denoted as θr. Here, the above anti-dive force Fad and the above anti-lift force Fal are expressed by the following equations 1 and 2, respectively. When the front wheel brake force Ff of the respective front wheels FL, FR and the brake wheel brake force Fr of the respective rear wheels RL, RR get larger, the anti-dive force Fad and the anti-lift force Fal become larger, and vice versa. The anti-dive force Fad may possibly be generated independently in the front left and right wheels FL, FR, to which the brake force is applied. Similarly, the anti-lift force Fal may possibly be generated independently in the rear left and right wheels RL, RR, to which the brake force is applied.

$$Fad = Ff \cdot \tan \theta f \quad \text{Equation (1)}$$

$$Fal = Fr \cdot \tan \theta r \quad \text{Equation (2)}$$

Next, a roll limiting control operation (hereinafter, referred to as a non-braking period roll limiting control operation), which is executed by the present system during a non-operating period of the brake pedal BP (non-braking period), will be described.

Figure 3A:
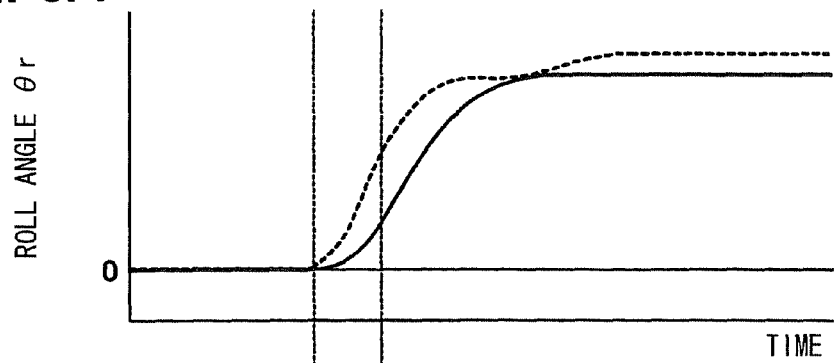
FIG. 3A is a diagram showing an exemplary change in a roll angle with time in a case of executing a non-braking period roll limiting control operation at the time of starting an abrupt steering operation in a straight-ahead driving state during a non-braking period as well as an exemplary change in the roll angle with time in a case of not executing the non-braking period roll limiting control operation at the time of starting the abrupt steering operation in the straight-ahead driving state during the non-braking period.
Figure 3B:
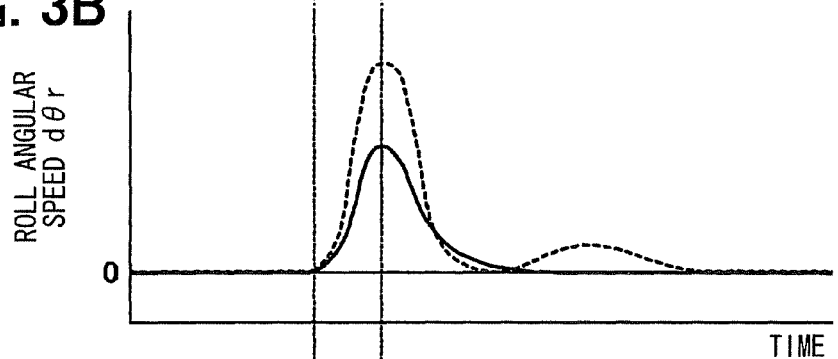
FIG. 3B is a diagram showing an exemplary change in a roll angular speed with time in the case of executing the non-braking period roll limiting control operation at the time of starting the abrupt steering operation in the straight-ahead driving state during the non-braking period as well as an exemplary change in the roll angular speed with time in the case of not executing the non-braking period roll limiting control operation at the time of starting the abrupt steering operation in the straight-ahead driving state during the non-braking period.
Figure 3C:
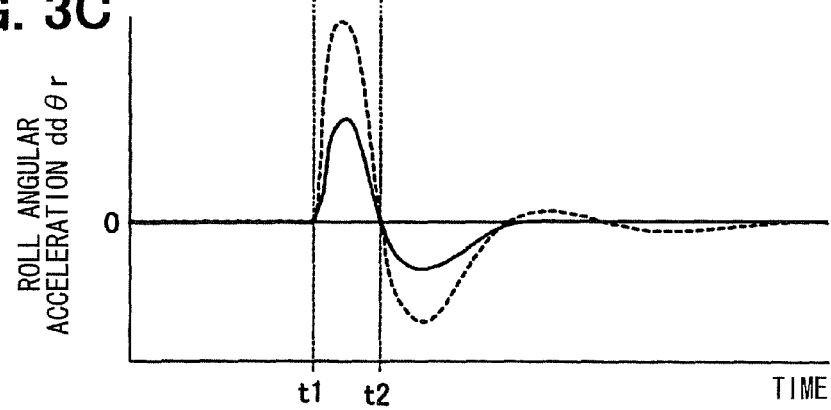
FIG. 3C is a diagram showing an exemplary change in a roll angular acceleration with time in the case of executing the non-braking period roll limiting control operation at the time of starting the abrupt steering operation in the straight-ahead driving state during the non-braking period as well as an exemplary change in the roll angular acceleration with time in the case of not executing the non-braking period roll limiting control operation at the time of starting the abrupt steering operation in the straight-ahead driving state during the non-braking period.

FIGS. 3A to 3C show an example where an abrupt steering operation of the steering wheel ST is executed from a straight-ahead driving state (θs=0) at time t1 during the non-braking period. Specifically, a dotted line in FIG. 3A shows an exemplary change in the roll angle θr with time. A dotted line in FIG. 3B shows an exemplary change in a roll angular speed dθr, which is a temporal differential value of the roll angle θr, with time. A dotted line in FIG. 3C shows an exemplary change in a roll angular acceleration ddθr, which is a temporal differential value of the roll angular speed dθr.

After the time t1, the inertial force (centrifugal force) acts at the center of gravity G of the vehicle in the radially outer direction of the turning arc of the vehicle due to the steering operation. Thus, the radially outer front wheel side suspension FS and the radially outer rear wheel side suspension FR, which are located on the radially outer side, make its stroke toward a compression side where these suspensions FS, FR are compressed. Also, the radially inner front wheel side suspension FS and the radially inner rear wheel side suspension FR, which are located on the radially inner side, make its stroke toward an expansion side where these suspensions FS, FR are expanded or extended. Therefore, the vehicle body is tilted radially outward (i.e., the radially outer lateral side of the vehicle body being tilted downward), and the roll angle θr is increased, as shown in FIG. 3A. During this process, as shown in FIG. 3C, the roll angular acceleration ddθr shows a positive maximum value (peak value) right after the time t1 and then changes from the positive range ("+" range) to the negative range ("−" range) at the time t2, which is shortly after the time t1.

In this case, an increasing gradient of the roll angle θr, i.e., the roll angular speed dθr around the time t2 becomes relatively large, so that convergence of the roll angle θr is delayed. This is due to the following reasons. That is, as described above, the present vehicle has the stabilizers, which show the moderate or relatively small anti-roll effect. Therefore, the sufficient moment (hereinafter, referred to as "anti-roll moment Mr"), which acts in a direction for limiting the roll motion of the vehicle, cannot be generated, so that the peak value of the roll angular acceleration ddθr right after the time t1 becomes the large positive value. Thus, the roll angular speed dθr (thereby the increasing gradient of the roll angle θr) right after the time t1 becomes the large value, and thereby the convergence of the roll angle θr is delayed. The roll motion, which has the large roll angular speed dθr, may cause the uncomfortable feeling of the occupant(s).

In order to limit the above increase of the roll angular speed dθr, it is effective to limit the peak value of the roll angular acceleration ddθr to a relatively small positive value right after the starting of the steering operation. In order to limit the peak value of the roll angular acceleration ddθr to the relatively small value, it is required to make the anti-roll moment Mr to a larger value right after the starting of the steering operation.

Figure 4:
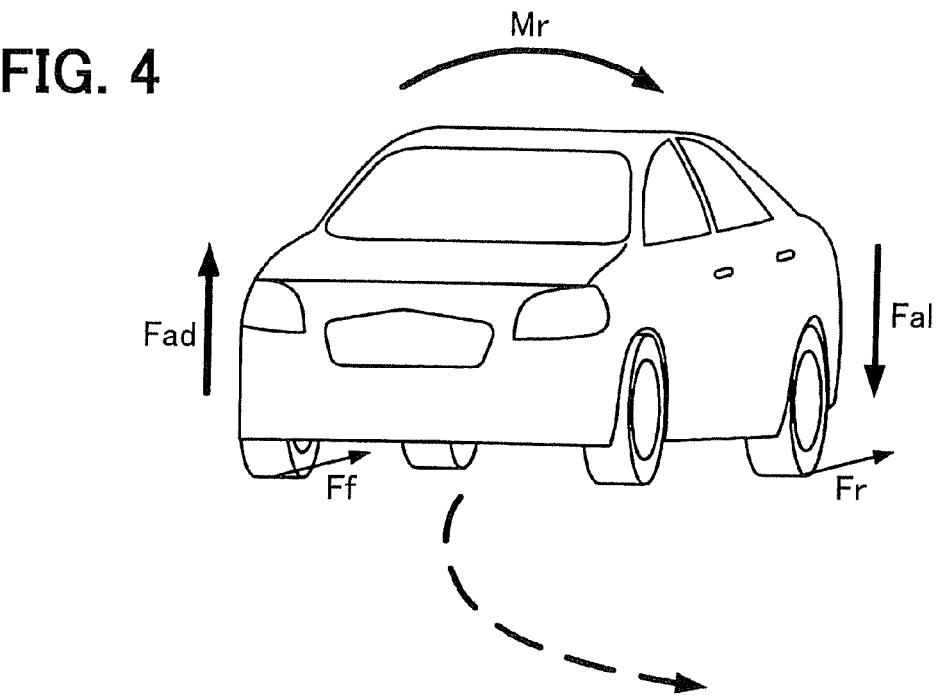
FIG. 4 is a schematic diagram showing brake forces of front and rear wheels, an anti-dive force and an anti-lift force caused by the non-braking period roll limiting control operation.

Therefore, in the present system, when the abrupt steering operation is started from the straight-ahead driving state during the non-braking period (i.e., the non-operating period of the brake pedal BP), a predetermined front wheel brake force Ff and a predetermined rear wheel brake force Fr (Ff=Fr) are applied to the radially outer front wheel and the radially inner rear wheel, respectively, through a time period between the time of starting of the steering operation and the time of changing of the roll angular acceleration ddθr from the positive range to the negative range (I.e., the time period between the time t1 and the time t2), as shown in FIG. 4. The above control operation of applying the front and rear wheel brake forces Ff, Fr is the non-braking period roll limiting control operation described above.

With this non-braking period roll limiting control operation, the radially outer front portion of the vehicle body receives the anti-dive force Fad (force for lifting the radially outer front portion of the vehicle body), which is expressed by the above equation (1), and the radially inner rear portion of the vehicle body receives the anti-lift force Fal (force for lifting the radially inner rear portion of the vehicle body), which is expressed by the above equation (2). In this case, both of the anti-dive force Fad and the anti-lift force Fal may act as the roll limiting force, i.e., the force that generates the anti-roll moment Mr (see FIG. 4). Thereby, it becomes difficult to increase the roll angle θr.

A sum of the front and rear wheel brake forces Ff, Fr is set to be equal to or smaller than a predetermined small value, which will not cause an uncomfortable feeling of the occupant(s) of the vehicle upon the application of the front and rear wheel brake forces Ff, Fr. That is, the deceleration of the vehicle body, which results from the application of the front and rear wheel brake forces Ff, Fr, is equal to or less than a predetermined value. Thus, the occupant(s) of the vehicle will not have the uncomfortable feeling with respect to the deceleration of the vehicle body upon the execution of the non-braking period roll limiting control operation. Furthermore, the front wheel brake force Ff is equal to the rear wheel brake force Fr. Therefore, a yawing moment, which is caused by the application of the front wheel brake force Ff and is directed in a direction opposite from the turning direction of the vehicle, becomes generally the same as a yawing moment, which is caused by the application of the rear wheel brake force Fr and is directed in the same direction as the turning direction of the vehicle, so that these yawing moments may possibly cancel with each other. As a result, a change in the lateral acceleration of the vehicle upon execution of the non-braking period roll limiting control operation is limited, and thereby the uncomfortable feeling of the occupant(s) of the vehicle during the turning of the vehicle may be limited.

A solid line shown in FIG. 3A indicates an exemplary change in the roll angle θr in the case where the non-braking period roll limiting control operation is executed through the time period between the time of starting of the steering operation and the time of changing of the roll angular acceleration ddθr from the positive range to the negative range (i.e., the time period between the time t1 and the time t2). A solid line shown in FIG. 3B indicates an exemplary change in the roll angular speed dθr in the case where the non-braking period roll limiting control operation is executed through the time period between the time t1 and the time t2. Furthermore, a solid line shown in FIG. 3C indicates an exemplary change in the roll angular acceleration ddθr in the case where the non-braking period roll limiting control operation is executed through the time period between the time t1 and the time t2.

In this case, the relatively large anti-roll moment Mr may possibly be generated right after the time t1, so that the peak value of the roll angular acceleration ddθr becomes the small positive value right after the time t1, as shown in FIG. 3C. Thus, the roll angular speed dθr (and thereby the increasing gradient of the roll angle θr) right after the time t1 also becomes small. As a result, the uncomfortable roll motion, which shows a large roll angular speed dθr, disappears, and the roll angle θr converges in the early stage.

In the present system, the end of the non-braking period roll limiting control operation is set to the time of changing of the roll angular acceleration ddθr from the positive range to the negative range (i.e., the time t2). Based on the various experiments and the simulations, it is confirmed that this can effectively accelerate the convergence of the roll angle θr.

This may be due to the following reasons. First, by the time t2, at which the roll angular acceleration ddθr is changed from the positive range to the negative range, the roll angle θr has become the relatively large value. Thus, the amount of stroke of each radially outer suspension and the amount of stroke of each radially inner suspension have also become the relatively large values. Thus, a force of the vehicle body support spring of each radially inner suspension, which is operated in the direction for increasing the roll angle, is significantly reduced, and a force of the vehicle body support spring of each radially outer suspension, which is operated in the direction for decreasing the roll angle, is significantly increased. In this way, the anti-roll effect is implemented. As a result, there is no substantial need for executing the non-braking period roll limiting control operation for increasing the anti-roll moment Mp after the time t2. Moreover, when the non-braking period roll limiting control operation is kept after the time t2, the convergence of the roll angle θr may be delayed.

As a result, in the present system, when there is a high possibility of occurrence of the large disorder (the uncomfortable roll motion) in the roll angle θr upon the starting of the abrupt steering operation in the non-braking period (non-operating period of the brake pedal BP), the non-braking period roll limiting control operation is executed to effectively limit the uncomfortable roll motion. The summary of the non-braking period roll limiting control operation has been described above.

Next, a roll limiting control operation (hereinafter, referred to as a braking period roll limiting control operation), which is executed by the present system during an operating period of the brake pedal BP (braking period), will be described.

In the present system, during the braking period, a brake force distribution (hereinafter, also referred to as "front-to-rear brake force distribution") between the front wheels FL, FR and the rear wheels RL, RR is normally adjusted to a basic distribution, which is determined based on the brake pedal pressing force Fp. Specifically, a target deceleration Gt is determined based on the brake pedal pressing force Fp, which is obtained by the pressing force sensor 42. Then, a target value of each of the front and rear wheels FL, FR, RL, RR is determined based on the target deceleration Gt and the basic distribution. Thereafter, the hydraulic unit 30 controls the wheel cylinder hydraulic pressure of each of the front and rear wheels FL, FR, RL, RR such that the brake force of each of the front and rear wheels FL, FR, RL, RR coincides with its target value.

Here, the wheel cylinder hydraulic pressure of the front left wheel FL and the wheel cylinder hydraulic pressure of the front right wheel FR are generally set to the same pressure. Also, the wheel cylinder hydraulic pressure of the rear left wheel RL and the wheel cylinder hydraulic pressure of the rear right wheel RR are generally set to the same pressure. Specifically, the same brake force is generally applied to the front left wheel FL and the front right wheel FR, and the same brake force is generally applied to the rear left wheel RL and the rear right wheel RR. Hereinafter, each of the brake forces of the four wheels in the above braking operation will be referred to as "basic brake force". Furthermore, the control operation for adjusting the brake force of each of the four wheels to the corresponding basic brake force will be referred to as a basic control operation.

In the present system, the braking period roll limiting control operation is executed during the braking period in a manner similar to that of the non-braking period roll limiting control operation, which is executed during the non-braking period.

Specifically, in the present system, when the abrupt application of the brakes is started in the straight-ahead driving state, the following control operation for controlling the four wheels is executed instead of the basic control operation: (1) the sum of the brake forces of the four wheels is made generally the same as that of the basic control operation, (2) the brake force of the radially inner front wheel is made smaller than the corresponding basic brake force of the radially inner front wheel by a first predetermined amount, (3) the brake force of the radially outer front wheel is made larger than the corresponding basic brake force of the radially outer front wheel by the first predetermined amount, (4) the brake force of the radially outer rear wheel is made smaller than the corresponding basic brake force of the radially outer rear wheel by the second predetermined amount, and (5) the brake force of the radially inner rear wheel is made larger than the corresponding basic brake force of the radially inner rear wheel by the second predetermined amount. The above control operation, in which the brake force difference is provided between the left and right wheels, is called the braking period roll limiting control operation. In the present example, the first predetermined amount is equal to the second predetermined amount (first predetermined amount=second predetermined amount).

Therefore, the anti-dive force, which acts on the radially inner front portion of the vehicle body in the braking period roll limiting control operation, becomes smaller than the anti-dive force, which acts on the radially inner front portion of the vehicle body in the basic control operation, by the amount, which corresponds to the first predetermined amount. Also, the anti-dive force, which acts on the radially outer front portion of the vehicle body in the braking period roll limiting control operation, becomes larger than the anti-dive force, which acts on the radially outer front portion of the vehicle body in the basic control operation, by the amount, which corresponds to the first predetermined amount. Furthermore, the anti-lift force, which acts on the radially outer rear portion of the vehicle body in the braking period roll limiting control operation, becomes smaller than the anti-lift force, which acts on the radially outer rear portion of the vehicle body in the basic control operation, by the amount, which corresponds to the second predetermined amount. In addition, the anti-lift force, which acts on the radially inner rear portion of the vehicle body in the braking period roll limiting control operation, becomes larger than the anti-lift force, which acts on the radially inner rear portion of the vehicle body in the basic control operation, by the amount, which corresponds to the second predetermined amount. In this way, the anti-roll moment Mr is increased in comparison to the above case of the basic control operation. Thereby, the increasing of the roll angle $\theta r$ becomes difficult, and the uncomfortable roll motion of the vehicle is limited.

Even when the braking period roll limiting control operation is performed, the total (sum) of the brake forces applied to the front wheels and the total (sum) of the brake forces applied to the rear wheels are generally the same as those of the basic control operation. Specifically, in the braking period roll limiting control operation, the front-to-rear brake force distribution is not changed from that of the basic control operation. In addition, the first predetermined amount and the second predetermined amount are generally the same, so that the yawing moment in the direction opposite from the turning direction of the vehicle caused by the difference between the brake force of the front left wheel FL and brake force of the front right wheel FR is generally the same as the yawing moment in the direction that is the same as the turning direction of the vehicle caused by the difference between brake force of the rear left wheel RL and the brake force of the rear right wheel RR, so that these moments may be canceled with each other. As a result, a change in the lateral acceleration of the vehicle upon execution of the braking period roll limiting control operation is limited, and thereby the uncomfortable feeling of the occupant(s) of the vehicle during the turning of the vehicle may be limited.

In the present system, the end of the braking period roll limiting control operation is set to the time of changing of the roll angular acceleration $dd\theta r$ from the positive range to the negative range (i.e., the time t2). Based on the various experiments and the simulations, it is confirmed that this can effectively accelerate the convergence of the roll angle $\theta r$. The reason for this is the same as that of the non-braking period roll limiting control operation.

As a result, in the present system, when there is a high possibility of occurrence of the large disorder (the uncomfortable roll motion) in the roll angle $\theta r$ upon the starting of the abrupt steering operation in the braking period, the braking period roll limiting control operation is executed to effectively limit the uncomfortable roll motion. The summary of the braking period roll limiting control operation has been described above.

Figure 5:
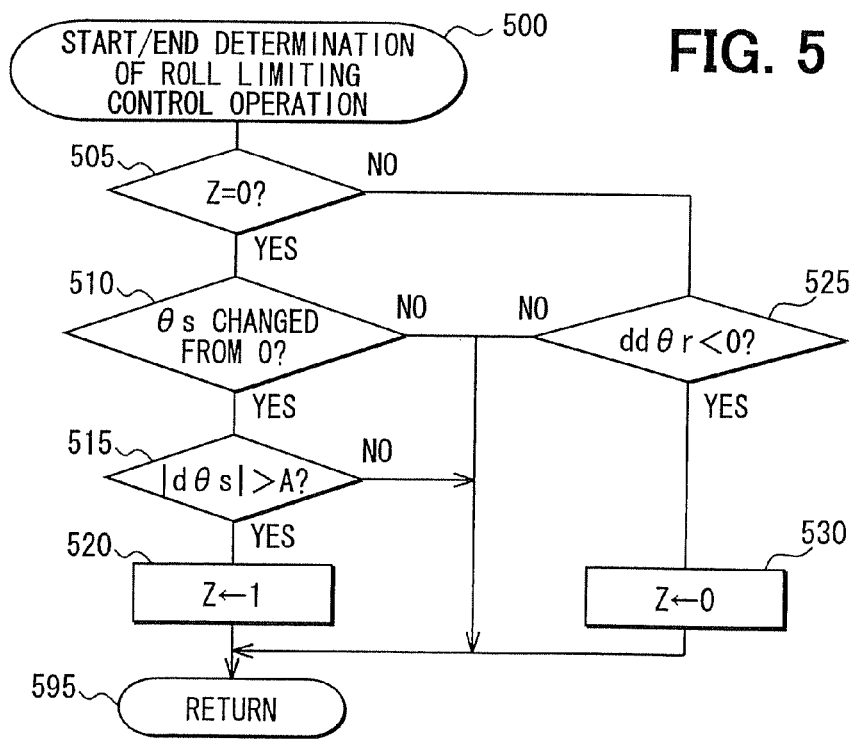
FIG. 5 is a flowchart showing a routine for making a start/end determination in the roll limiting control operation executed by a CPU shown in FIG. 1.

Next, the actual operation of the present system will be described in view of FIGS. 5 and 6, which show flowcharts of the routines executed by the CPU 51 of the electronic controller 50. The CPU 51 repeats the routine for determining the start/end of the roll limiting control operation (specifically, the non-braking period roll limiting control operation and the braking-period roll limiting control operation) shown in FIG. 5 at predetermined time intervals (e.g., every 6 msec). Thus, at the predetermined timing, the CPU 51 starts the routine at step 500 and proceeds to step 505. At step 505, it is determined whether a value of a flag Z is "0" (zero). Here, when the value of the flag Z is "1", it indicates the roll limiting control operation (specifically, the non-braking period roll limiting control operation or the braking period roll limiting control operation) is currently executed. In contrast, when the value of the flag Z is "0", it indicates that the roll limiting control operation (specifically, the non-braking period roll limiting control operation or the braking period roll limiting control operation) is currently not executed.

In the case of Z=0 (in the case of not currently executing the roll limiting control operation), the CPU 51 proceeds to step 510. At step 510, it is determined whether the steering angle $\theta s$ is changed from zero to another value, i.e., it is determined whether the steering operation has started in the straight-ahead driving state. When YES is returned at step 510, the CPU 51 proceeds to step 515. At step 515, it is determined whether an absolute value of an increasing rate $d\theta s$ of the steering angle $\theta s$ is larger than a predetermined value A. Specifically, at steps 510, 515, it is determined whether the abrupt steering operation from the straight-ahead driving state is started regardless of whether the braking operation is currently executed (i.e., whether it is in the braking period).

When NO is returned at one of steps 510, 515, the CPU 51 immediately proceeds to step 595 and terminates the current routine. In this case, the value of the flag Z is maintained to "0". In contrast, when YES is returned at steps 510, 515, the CPU 51 proceeds to step 520 and changes the value of the flag Z from "0" to "1".

On the other hand, in the case where the flag Z=1 (i.e., in the case of currently executing the roll limiting control operation), NO is returned at step 505, and thereby the CPU 51 proceeds to step 525. At step 525, it is determined whether the roll angular acceleration $dd\theta r$ is changed from the positive range to the negative range. When NO is returned at step 525, the CPU proceeds to step 595 and terminates the current routine. In this case, the value of the flag Z is maintained to "1". The roll angular acceleration $dd\theta r$ is obtained by obtaining the roll angle $\theta r$ from the roll angle sensor 43 and then temporally differentiating the obtained roll angle $\theta r$ twice. In contrast, when YES is returned at step 525, the CPU 51 proceeds to step 530 and changes the value of the flag Z from "1" to "0".

As described above, by repeating the routine of FIG. 5, when the abrupt steering operation is started regardless of whether the braking operation is currently executed in the state of the flag Z=0, the value of the flag Z is changed from "0" to "1". Also, when the roll angular acceleration $dd\theta r$ is changed from the positive range to the negative range regardless of whether the braking operation is currently executed in the state of the flag Z=1, the value of the flag Z is changed from "1" to "0".

The CPU 51 repeats the routine of the brake control operation shown in FIG. 6 at predetermined time intervals (e.g., every 6 msec). Thus, at the predetermined timing, the CPU 51 starts the routine at step 600 and proceeds to step 605. At step 605, it is determined whether a value of the brake pedal pressing force Fp is larger than zero, i.e., whether it is in the braking period.

First, the case in the non-braking period (non-operating period of the brake pedal BP) will be described. In this case, NO is returned at step 605, and the CPU 51 proceeds to step 610. At step 610, it is determined whether the value of the flag Z is zero (i.e., Z=0).

Now, it is assumed that the abrupt steering operation from the straight-ahead driving state is started in the non-braking period, and the value of the flag Z is 1 (i.e., Z=1), as discussed at step 520. In such a case, NO is returned at step 610, and the CPU 51 proceeds to step 615. At step 615, the CPU 51 outputs an execution command for executing the non-braking period roll limiting control operation to the hydraulic unit 30. This step 615 corresponds to a first roll limiting control means of the present invention.

The above process is executed repeatedly until the flag Z is set to "0" (i.e., the flag Z=0). Thus, the non-braking period roll limiting control operation is maintained until the time of changing of the roll angular acceleration dd$\theta$r from the positive range to the negative range, so that the predetermined brake force Ff, Fr (Ff=Fr) is kept applied to the radially outer front wheel and the radially inner rear wheel. In this way, it is possible to limit the uncomfortable roll motion right after the starting of the steering operation during the non-braking period.

When the roll angular acceleration dd$\theta$r is changed from the positive range to the negative range, the flag Z is returned from "1" to "0" (see step 530). As a result, YES is returned at step 610. Thereby, the CPU 51 proceeds to step 620 where it is determined whether it is still within a predetermined time period from the time of changing of the value of the flag Z from "1" to "0".

Here, the current time point in this state is right after the changing of the roll angular acceleration dd$\theta$r from the positive range to the negative range, so that it is still within the above predetermined time period. Thus, YES is returned at step 620, and the CPU 51 proceeds to step 625. At step 625, a non-braking period transition control operation is executed. The non-braking period transition control operation is a control operation for gradually returning the brake force of the radially outer front wheel and the brake force of the radially inner rear wheel, which are applied by the non-braking period roll limiting control operation, to zero.

This kind of process is repeatedly executed until the end of the predetermined time period. Thus, the non-braking period transition control operation is maintained until the end of the predetermined time period, so that the brake force of the radially outer front wheel and the brake force of the radially inner rear wheel are gradually reduced to zero.

When the predetermined time period is elapsed, NO is retuned at step 620, and thereby the CPU 51 immediately proceeds to step 695 where the current routine is terminated. Thereby, the brake force of the radially outer front wheel and the brake force of the radially inner rear wheel, which are applied in the non-braking period roll limiting control operation, become zero. That is, the brake forces of the four wheels all become zero.

Next, the case in the braking period (i.e., the time of executing the braking operation) will be described. In this case, YES is returned at step 605, and the CPU 51 proceeds to step 630. At step 630, it is determined whether the value of the flag Z is zero (i.e., Z=0).

Now, it is assumed that the abrupt steering operation from the straight-ahead driving state is started in the braking period, the value of the flag Z is 1 (i.e., Z=1), as discussed at step 520. In such a case, NO is returned at step 630, and the CPU 51 proceeds to step 635. At step 635, the CPU 51 outputs an execution command for executing the braking period roll limiting control operation to the hydraulic unit 30. This step 635 corresponds to a second roll limiting control means of the present invention.

The above process is executed repeatedly until the flag Z is set to "0" (i.e., the flag Z=0). Thus, the braking period roll limiting control operation is maintained until the time of changing of the roll angular acceleration dd$\theta$r from the positive range to the negative range, so that the brake force difference is kept provided between the left and right wheels. In this way, it is possible to limit the uncomfortable roll motion right after the starting of the steering operation during the braking period.

When the roll angular acceleration dd$\theta$r is changed from the positive range to the negative range, the flag Z is returned from "1" to "0" (see step 530). As a result, YES is returned at step 630. Thereby, the CPU 51 proceeds to step 640 where it is determined whether it is still within the predetermined time period from the time of changing of the value of the flag Z from "1" to "0".

Here, the current time point in this state is right after the changing of the roll angular acceleration dd$\theta$r from the positive range to the negative range, so that it is still within the above predetermined time period. Thus, YES is returned at step 640, and the CPU 51 proceeds to step 645. At step 645, a braking period transition control operation is executed. The braking period transition control operation is a control operation for gradually returning the brake force difference between the left and right wheels provided by the braking period roll limiting control operation to zero.

This kind of process is repeatedly executed until the end of the predetermined time period. Thus, the braking period transition control operation is maintained until the end of the predetermined time period, so that the brake force difference between the left and right wheels is gradually reduced to zero.

When the predetermined time period is elapsed, NO is retuned at step 640, and thereby the CPU 51 proceeds to step 650. At step 650, the CPU 51 commands the hydraulic unit 30 to execute the basic control operation. This step 650 corresponds to a basic control means of the present invention.

In this way, the basic control operation is executed, so that the brake forces of the four wheels are respectively adjusted to the corresponding basic brake forces, which are determined based on the brake pedal pressing force Fp (>0).

Figure 7A:
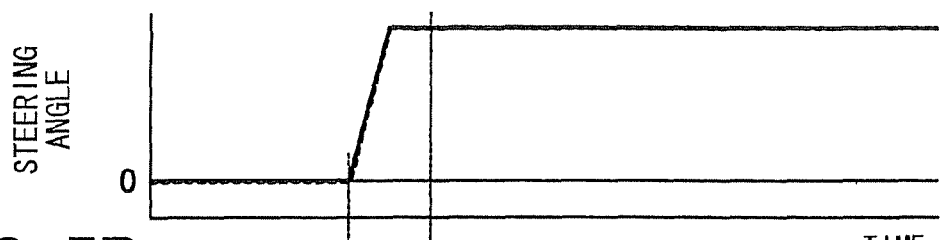
FIG. 7A is a diagram showing an exemplary change in a steering angle with time in a case of starting the abrupt steering operation in the straight-ahead driving state during the non-braking period.
Figure 7B:
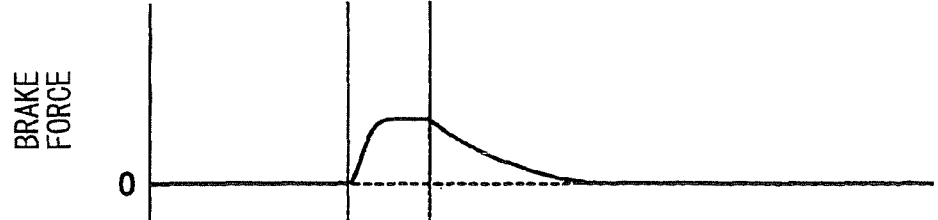
FIG. 7B is a diagram showing an exemplary change in a brake force with time in the case of starting the abrupt steering operation in the straight-ahead driving state during the non-braking period.
Figure 7C:
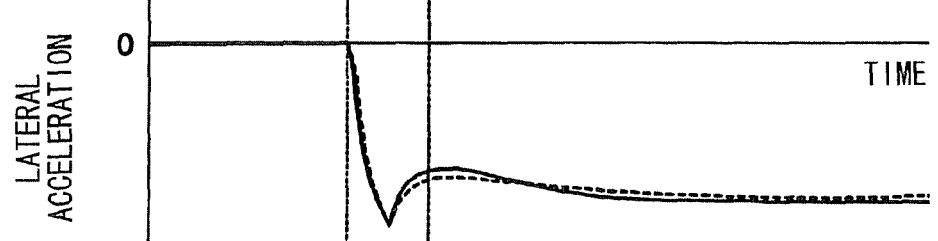
FIG. 7C is a diagram showing an exemplary change in a lateral acceleration with time in the case of starting the abrupt steering operation in the straight-ahead driving state during the non-braking period.
Figure 7D:
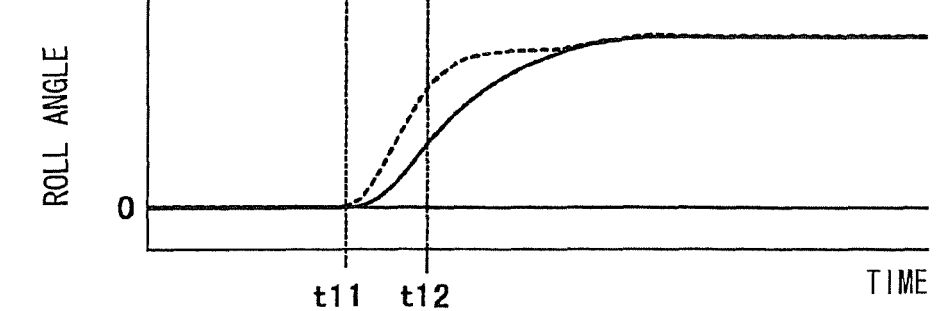
FIG. 7D is a diagram showing an exemplary change in a roll angle with time in the case of starting the abrupt steering operation in the straight-ahead driving state during the non-braking period.

FIGS. 7A to 7D show an example where the abrupt steering operation from the straight-ahead driving state is started at the time t11. More specifically, FIG. 11A shows an exemplary change in the steering angle with time. FIG. 7B shows an exemplary change in the brake force of the radially outer front wheel and of the radially inner rear wheel with time. FIG. 7C shows an exemplary change in the lateral acceleration of the vehicle body with time. FIG. 7D shows an exemplary change in the roll angle of the vehicle body with time. A dotted line in each of FIGS. 7A to 7D shows a case where the non-braking period roll limiting control operation is not executed. A solid line in each of FIGS. 7A to 7D shows a case where the brake control operation (specifically, the non-braking period roll limiting control operation or the non-braking period transition control operation) is executed by the present system according to the flowcharts shown in FIGS. 5 and 6. In FIGS. 7A to 7D, the non-braking period roll limiting control operation is executed during a time period between the time t11 and the time t12, and thereafter the non-braking period transition control operation is executed.

As understood from FIG. 7D, when the non-braking period roll limiting control operation is executed by the present system, an increasing rate of the roll angle is reduced (see the solid line in FIG. 7D). Furthermore, since the brake force of the radially outer front wheel and the brake force of the radially inner rear wheel are generally the same, the yawing moment, which is caused by the application of the brake force to the radially outer front wheel and is directed in a direction opposite from the turning direction of the vehicle, becomes generally the same as the yawing moment, which is caused by the application of the brake force to the radially inner rear wheel and is directed in the same direction as the turning direction of the vehicle, so that these yawing moments may possibly cancel with each other. As a result, even when the non-braking period roll limiting control operation is executed, the lateral acceleration of the vehicle changes generally in the same manner as that of the time of not executing the non-braking period roll limiting control operation. Therefore, the driver will not have any substantial uncomfortable turning feeling.

As described above, the vehicle motion control system of the present embodiment is applied to the vehicle that has the front wheel side suspensions and the rear wheel side suspensions, which have the anti-dive geometry and the anti-dive geometry, respectively. When the abrupt steering operation is executed from the straight-ahead driving state during the non-braking period, the non-braking period roll limiting control operation, which applies the corresponding brake force to the radially outer front wheel and to the radially inner rear wheel, is executed for the predetermined short time period from the time of starting of the steering operation. In this way, the anti-dive force is generated at the radially outer front portion of the vehicle, i.e., the force for lifting the radially outer front portion of the vehicle body is generated. Also, the anti-lift force is generated at the radially inner rear portion of the vehicle body, i.e., the force for downwardly urging the radially inner rear portion of the vehicle body is generated. Therefore, the anti-roll moment Mr is generated (see FIG. 4). Thereby, it becomes difficult to increase the roll angle $\theta r$.

As a result, in the case where the abrupt steering operation is started during the non-braking period to possibly cause the uncomfortable roll motion, the increase in the roll angle is limited by generating the anti-roll moment without providing a special mechanism in the suspensions. Thus, the suspensions, which do not have the large anti-roll effect, are adapted, so that the good ride feeling is maintained during the straight-ahead driving, and the roll motion of the vehicle (uncomfortable roll motion of the vehicle) at the time of turning is effectively limited.

Furthermore, during the braking period, the basic control operation is normally executed, so that the brake forces of the four wheels are respectively controlled to the corresponding basic brake forces. When the abrupt steering operation is executed from the straight-ahead driving state during the braking period, the braking period roll limiting control operation, which provides the brake force difference between the left and right wheels, is executed only for the predetermined short time period from the time of starting the steering operation. Even in this way, the anti-roll moment Mr is generated, and the increase of the roll angle $\theta r$ is limited.

As a result, in the case where the abrupt steering operation is started during the braking period to possibly cause the uncomfortable roll motion, the increase in the roll angle is limited by generating the anti-roll moment without providing the special mechanism in the suspensions.

The present invention is not limited to the above embodiment, and the above embodiment may be modified in various ways within the scope of the present invention. For example, in the above embodiment, the end of the roll limiting control operation (i.e., the non-braking period roll limiting control operation or the braking period roll limiting control operation), i.e., the time of changing of the roll angular acceleration dd$\theta r$ from the positive range to the negative range is determined based on the roll angular acceleration dd$\theta r$, which is obtained by temporarily differentiating the roll angle $\theta r$ obtained from the roll angle sensor 43 twice (see step 525). Alternatively, in place of the roll angle sensor 43, a roll angular speed sensor may be used, and a roll angular acceleration, which is obtained by temporarily differentiating the roll angular speed obtained by the roll angular speed sensor only once, may be used to determine the end of the roll limiting control operation, i.e., the time of changing of the roll angular acceleration dd$\theta r$ from the positive range to the negative range. Furthermore, for this purpose, it is possible to use a roll angular acceleration that is obtained based on the measurements of vehicle body height sensors, which are provided to the vehicle body left side and the vehicle body right side.

Furthermore, the time period between the time of starting the abrupt steering operation and the time of changing of the roll angular acceleration dd$\theta r$ from the positive range to the negative range may be estimated in advance according to an eigenfrequency in the roll direction of the vehicle body, which is obtained based on the design specifications of the vehicle body. Thus, the duration time period of the roll limiting control operation (i.e., the non-braking period roll limiting control operation or the braking period roll limiting control operation) may be set to a corresponding predetermined time period, which is determined based on the above eigenfrequency.

In addition, in the above embodiment, the same brake force is generally applied to the radially outer front wheel and the radially inner rear wheel in the non-braking period roll limiting control operation. Alternatively, different brake forces may be applied to the radially outer front wheel and the radially inner rear wheel, respectively in the non-braking period roll limiting control operation. Furthermore, in the non-braking period roll limiting control operation, the above brake force may be applied to only one of the radially outer front wheel and the radially inner rear wheel.

Furthermore, in the braking period roll limiting control operation of the above embodiment, the brake force difference between the front left and right wheels is set to be generally the same as the brake force difference between the rear left and right wheels (i.e., the first predetermined amount=the second predetermined amount). Alternatively, the brake force difference between the front left and right wheels may be set to be different from the brake force difference between the rear left and right wheels. Also, in the braking period roll limiting control operation, the brake force difference may be provided only to the front wheels or the rear wheels.

Also, in the above embodiment, when the absolute value of the increasing rate d$\theta s$ of the steering angle $\theta s$ at the time of starting the steering operation gets smaller, the brake force, which is applied to the radially outer front wheel, and the brake force, which is applied to the radially inner rear wheel, may become smaller.

Similarly, when the absolute value of the increasing rate d$\theta s$ of the steering angle $\theta s$ at the time of starting the steering operation gets smaller, the brake force difference between the left and right wheels set in the braking period roll limiting control operation may become smaller.

Furthermore, in the above embodiment, the condition of steps 510, 515 is used as the condition for starting the roll limiting control operation. Alternatively, the condition for starting the roll limiting control operation may include an additional condition of that the vehicle is currently traveling. The determination of whether the vehicle is currently traveling may be made based on whether the vehicle speed, which is obtained based on the measurements of the wheel speed sensors 41fl, 41fr, 41rl, 41rr, is zero.

In addition, in the above embodiment, the brake-by-wire system is used as the brake control apparatus. Alternatively, as the brake control apparatus, it is possible to use a pressure adjustable system, in which the master cylinder pressure itself is supplied to the respective wheel cylinders during the non-control time period, and in which the respective wheel cylinder pressures are adjusted to a corresponding different pressure that is different from the master cylinder pressure during the control time period. In this case, the brake apparatus (e.g., a brake pad, a brake disk) of each of the four wheels is designed to have the above corresponding basic brake force, and each wheel cylinder pressure is adjusted to the different pressure, which is different from the master cylinder pressure, only during the roll limiting control operation.

In the above embodiment, the front left and right independent suspensions FS and the rear left and right independent suspensions RS are used. However, the present invention is not limited to this suspension system. In other words, a single front suspension, which supports the front left and right wheels and have the anti-dive geometry, and/or a single rear suspension, which supports the rear left and right wheels and have the anti-lift geometry, may be alternatively used as the suspension system of the present invention.

In the above embodiment, the pressing force sensor 42 is used to determine the target deceleration Gt and also to determine whether the braking operation is executed. In place of the pressing force sensor 42, a well known stroke sensor may be used to measure the amount of operation of the brake pedal Bp and thereby to determine the target deceleration Gt as well as to determine whether the brake operation is executed.

Additional advantages and modifications will readily occur to those skilled in the art. The invention in its broader terms is therefore not limited to the specific details, representative apparatus, and illustrative examples shown and described.

The invention claimed is:

1. A motion control system for a vehicle, comprising:
   at least one front wheel side suspension that is provided to front left and right wheels of the vehicle and has an anti-dive geometry;
   at least one rear wheel side suspension that is provided to rear left and right wheels of the vehicle and has an anti-lift geometry;
   a brake control apparatus that is operable to independently apply and control brake forces at the front left and right wheels and the rear left and right wheels, respectively; and
   a first roll limiting control means for controlling the brake control apparatus during steering operation of a steering operating member of the vehicle by a driver from a straight-ahead driving state of the vehicle in a non-operating period of a brake operating member of the vehicle by the driver, wherein:
   the first roll limiting control means controls the brake control apparatus such that the brake force is applied to at least one of a radially outer one of the front left and right wheels which is located on an outer side in a radial direction of an arc of turn of the vehicle upon starting the steering operation, and a radially inner one of the rear left and right wheels, which is located on an inner side in the radial direction of the arc of the turn, while a sum of the brake force of the radially outer one of the front left and right wheels and the brake force of the radially inner one of the rear left and right wheels is equal to or smaller than a predetermined value;
   the first roll limiting control means starts the controlling of the brake control apparatus when a rate of change in an amount of operation of the steering operating member in the non-operating period of the brake operating member becomes larger than a predetermined rate;
   the first roll limiting control means terminates the controlling of the brake control apparatus when an angular acceleration of a roll angle of a vehicle body of the vehicle is changed from a positive range to a negative range; and
   the roll angle of the vehicle body is defined such that when a radially outer side of the vehicle body, which is located on the outer side in the radial direction of the arc of the turn, is tilted downward, the roll angle of the vehicle body is in the positive range.

2. The motion control system according to claim 1, wherein the first roll limiting control means controls the brake control apparatus such that the brake force, which is applied to the radially outer one of the front left and right wheels, is generally the same as the brake force, which is applied to the radially inner one of the rear left and right wheels.

3. The motion control system according to claim 1, further comprising:
   a basic control means for controlling the brake control apparatus based on an amount of operation of the brake operating member in an operating period of the brake operating member such that basic brake forces are applied to the front left and right wheels (FL, FR) and the rear left and right wheels, respectively, in such a manner that the basic brake forces of the front left and right wheels are generally equal to each other, and the basic brake forces of the rear left and right wheels are generally equal to each other; and
   a second roll limiting control means for controlling the brake control apparatus during steering operation of the steering operating member by the driver from the straight-ahead driving state of the vehicle in the operating period of the brake operating member, wherein:
   the second roll limiting control means controls the brake control apparatus such that a sum of the brake forces of the front left and right wheels and the rear left and right wheels is generally the same as a sum of the basic brake forces of the front left and right wheels and the rear left and right wheels, and at least one of the following two conditions is satisfied:
      the brake force of the radially outer one of the front left and right wheels is larger than the brake force of a radially inner one of the front left and right wheels located on the inner side in the radial direction of the arc of the turn; and
      the brake force of the radially inner one of the rear left and right wheels is larger than the brake force of a radially outer one of the rear left and right wheels located on the outer side in the radial direction of the arc of the turn;
   the second roll limiting control means starts the controlling of the brake control apparatus when the rate of change in the amount of operation of the steering operating member in the operating period of the brake member becomes larger than the predetermined rate; and the second roll limiting control means terminates the controlling of the brake control apparatus when the angular acceleration of the roll angle of the vehicle body is changed from the positive range to the negative range.

4. The motion control system according to claim 3, wherein the second roll limiting control means controls the brake control apparatus to satisfy at least one of the following two conditions:

the brake force of the radially inner one of the front left and right wheels is smaller than the basic brake force of the radially inner one of the front left and right wheels by a first amount, while the brake force of the radially outer one of the front left and right wheels is larger than the basic brake force of the radially outer one of the front left and right wheels by the first amount; and the brake force of the radially outer one of the rear left and right wheels is smaller than the basic brake force of the radially outer one of the rear left and right wheels by a second amount, while the brake force of the radially inner one of the rear left and right wheels is larger than the basic brake force of the radially inner one of the rear left and right wheels by the second amount.

5. The motion control system according to claim 4, wherein the first predetermined amount and the second predetermined amount are generally equal to each other.

6. The motion control system according to claim 1, wherein:

the anti-dive geometry of the at least one front wheel side suspension is set such that an instantaneous center of motion of each front wheel relative to the vehicle body caused by a stroke of the at least one front wheel side suspension is located at a point, which is on an upper side of a ground contact point of the front wheel and is on a vehicle body rear side of the ground contact point of the front wheel as viewed from a lateral side of the vehicle body; and the anti-lift geometry of the at least one rear wheel side suspension is set such that an instantaneous center of motion of each rear wheel relative to the vehicle body caused by a stroke of the at least one rear wheel side suspension is located at a point, which is on an upper side of a ground contact point of the rear wheel and is on a vehicle body front side of the ground contact point of the rear wheel, as viewed from the lateral side of the vehicle body.

\* \* \* \* \*